United States Patent [19]
Partington et al.

[11] Patent Number: 5,882,075
[45] Date of Patent: Mar. 16, 1999

[54] POWER SEAT DRIVE SYSTEM

[75] Inventors: Eric Partington, Troy; Andrew Massara, Southfield; James Masters, Farmington Hills; David Fu, Rochester Hills, all of Mich.

[73] Assignee: Lear Corporation, Southfield, Mich.

[21] Appl. No.: 823,535

[22] Filed: Mar. 24, 1997

Related U.S. Application Data

[60] Provisional application No. 60/016,775 May 7, 1996.

[51] Int. Cl.$^6$ ........................................................ A47C 1/02
[52] U.S. Cl. ............... 297/344.13; 297/330; 297/344.17; 74/665 GA; 248/631; 248/157
[58] Field of Search ........................................ 297/330, 327, 297/344.17, 344.12, 344.13, 344.16, 362.11, 284.6, 284.2, 284.1; 74/665 GA; 248/631, 157

[56] References Cited

U.S. PATENT DOCUMENTS

| | | | |
|---|---|---|---|
| 4,470,632 | 9/1984 | Babbs | 297/330 X |
| 5,082,326 | 1/1992 | Sekido et al. | 297/284.6 |
| 5,092,197 | 3/1992 | Hauger | 297/330 X |
| 5,528,959 | 6/1996 | Yamakami | 297/330 X |

FOREIGN PATENT DOCUMENTS

| 232685 | 8/1987 | European Pat. Off. | 297/362.11 |
|---|---|---|---|

*Primary Examiner*—Laurie K. Cranmer
*Attorney, Agent, or Firm*—MacMillan, Sobanski & Todd, LLC

[57] ABSTRACT

An adjustable seat assembly for an automobile comprises a seat portion which is slidably mounted for movement between fore and aft adjusted positions within a passenger compartment of the automobile. A pair of elongated power screws under the seat portion adjust the fore and aft position of the seat assembly in response to a reversible rotary input from a universal motor. The seat portion includes a pair of internal air bladders which independently inflate and deflate to adjust the height and tilt of the seat portion. A backrest portion extends upwardly from the seat portion, and may include a pneumatic lumbar adjustment device and other contour-adjusting air bladders. The universal motor operates both the power screws and the pneumatic adjustment devices. A transmission is operatively connected to the universal motor for selectively transmitting reversible rotary input to the power screws and pressurized fluid to any one of the pneumatic adjustment devices. The transmission includes a pinion sidably disposed along the spline of the universal motor output shaft, and a pair of spur gears disposed one each on a pneumatic pump and a rotary power take-off. A shuttle forces the pinion between alternating engagement with the spur gears. Every other tooth of the pinion is relieved at its ends to facilitate running engagement without an intermediate clutch. In an alternative embodiment of the transmission, an intermediate clutch is stationed between the output shaft of the universal motor and the pinion, and the pneumatic pump is continuously engaged with the universal motor but vents to atmosphere when the clutch is engaged.

44 Claims, 12 Drawing Sheets

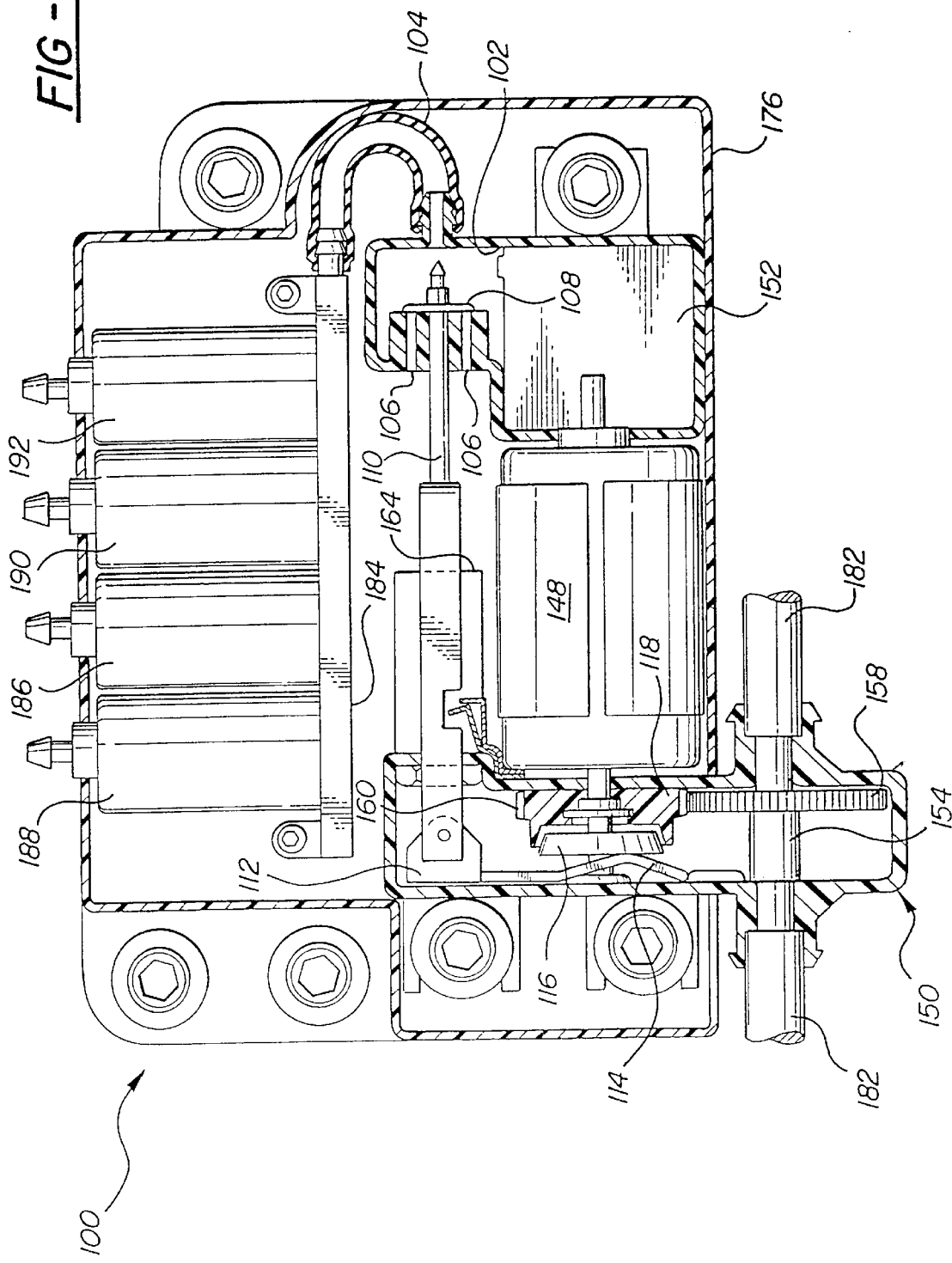

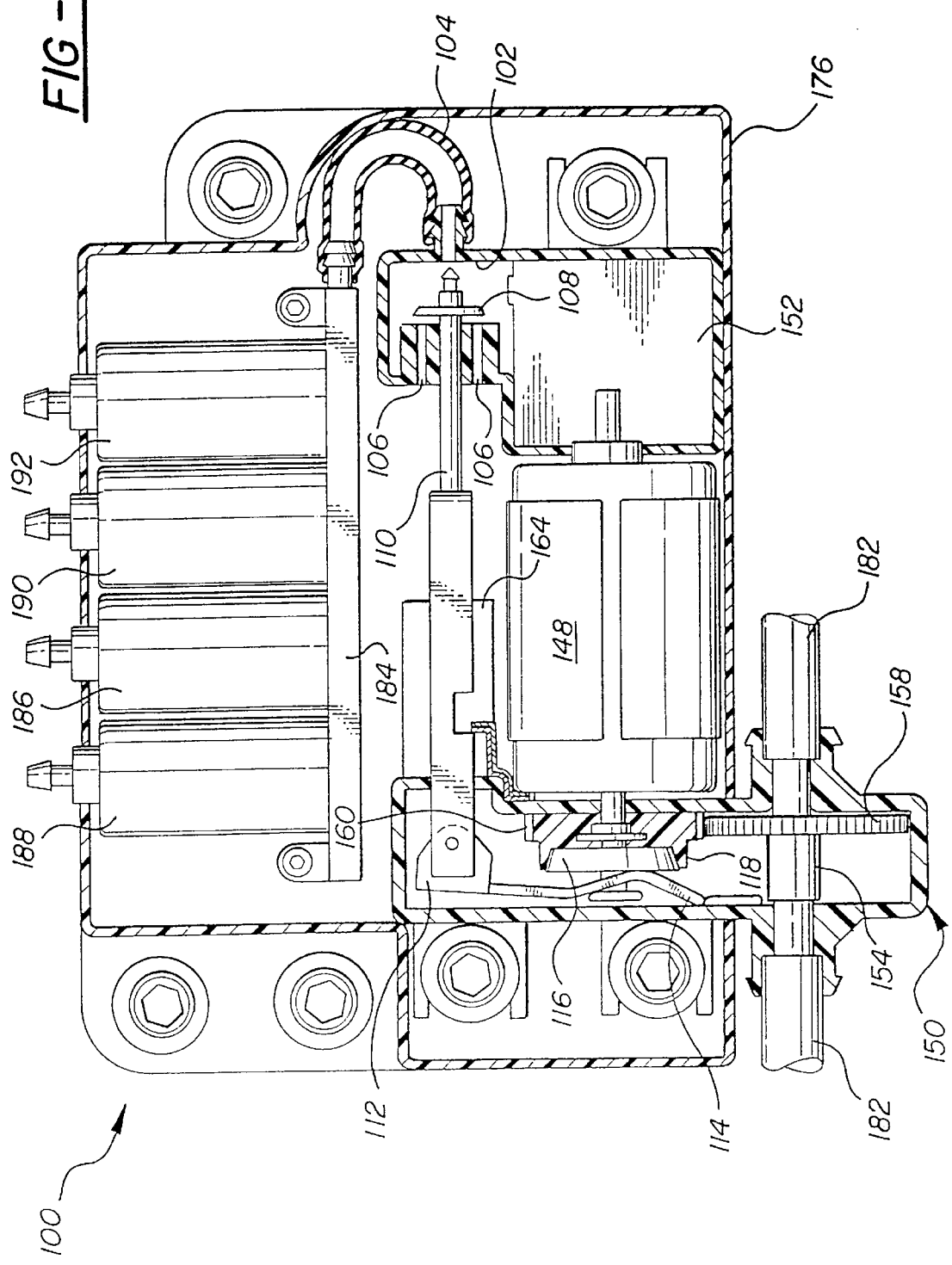

POWER SEAT DRIVE SYSTEM

This application claims benefit of provisional application 60/016,775 filed May 7, 1996.

BACKGROUND OF THE INVENTION

1. Field of the Invention

The subject invention relates generally to an adjustable seat assembly for an automobile, and in particular an automobile seat assembly having a single motor controlling numerous seat position and seat contour altering features.

2. Description of Related Art

For ergonomic and therapeutic reasons, it is desirable to provide seat position and contour adjustment in an automobile seat. For example, it is critical that the fore and aft position of the seat assembly be adjustable, so as to accommodate occupants of differing height and body construction. It is also frequently desirable to raise and lower the seat and tilt it forwardly or rearwardly. Furthermore, it is well know to incorporate an adjustable lumbar support mechanism and perhaps adjustment of the bolster contour, head/neck contour, and the like. While manually operated systems for accomplishing these adjustments are available, luxury cars are typically fitted with full power-assisted devices.

Although many prior art power adjusted seat assemblies function satisfactorily, there remains the ever-present desire to further reduce both cost and weight, while maintaining and/or increasing durability, functionality and assembly. Toward this end, there have been several attempts in the prior art to control all of these various position and contour adjustments with a single motor. However, none have successfully achieved a low cost, low weight system which is ruggedly durable, functional and easy to assemble.

SUMMARY OF THE INVENTION

An adjustable seat assembly for an automobile comprises a seat portion which is slidably connected to a floor mount for movement between fore and aft adjusted positions within a passenger compartment of the automobile. A position adjustor is operatively disposed between the seat portion and floor mount for forcibly adjusting the fore and aft position of the seat assembly in response to a reversible rotary input. A backrest portion extends upwardly from the seat portion. A primary pneumatic adjustor is operatively associated with one of the backrest portion and the seat portion for adjusting a position and/or contour of the one of the backrest portion and seat portion in response to pressurized fluid input. A single, universal motor operates both the position adjustor and the pneumatic adjustor. A transmission is operatively connected to the universal motor for selectively transmitting reversible rotary input to the position adjustor and pressurized fluid input to the primary pneumatic adjustor.

The subject assembly uniquely overcomes the disadvantages and shortcomings of the prior art by using a single drive motor to selectively transmit either rotary motion to a power adjustor or pneumatic pressure to a primary pneumatic adjustor. The pneumatic adjustor is very light weight and durable.

BRIEF DESCRIPTION OF THE DRAWINGS

Other advantages of the present invention will be readily appreciated as the same becomes better understood by reference to the following detailed description when considered in connection with the accompanying drawings wherein:

FIG. 12 is a top view of the alternative transmission showing the transmission clutch disengaged and the associated bypass valve closed so as to transmit pressurized air from the pneumatic pump to the pneumatic adjustors; and FIG. 13 is a top view of the alternative transmission showing the transmission clutch engaged so as to transmit driving torque from the motor to the power take-off, and the associated bypass valve open to vent pressurized air from the pneumatic pump or from an open pneumatic adjustor.

DESCRIPTION OF THE PREFERRED EMBODIMENT

Figure 1:
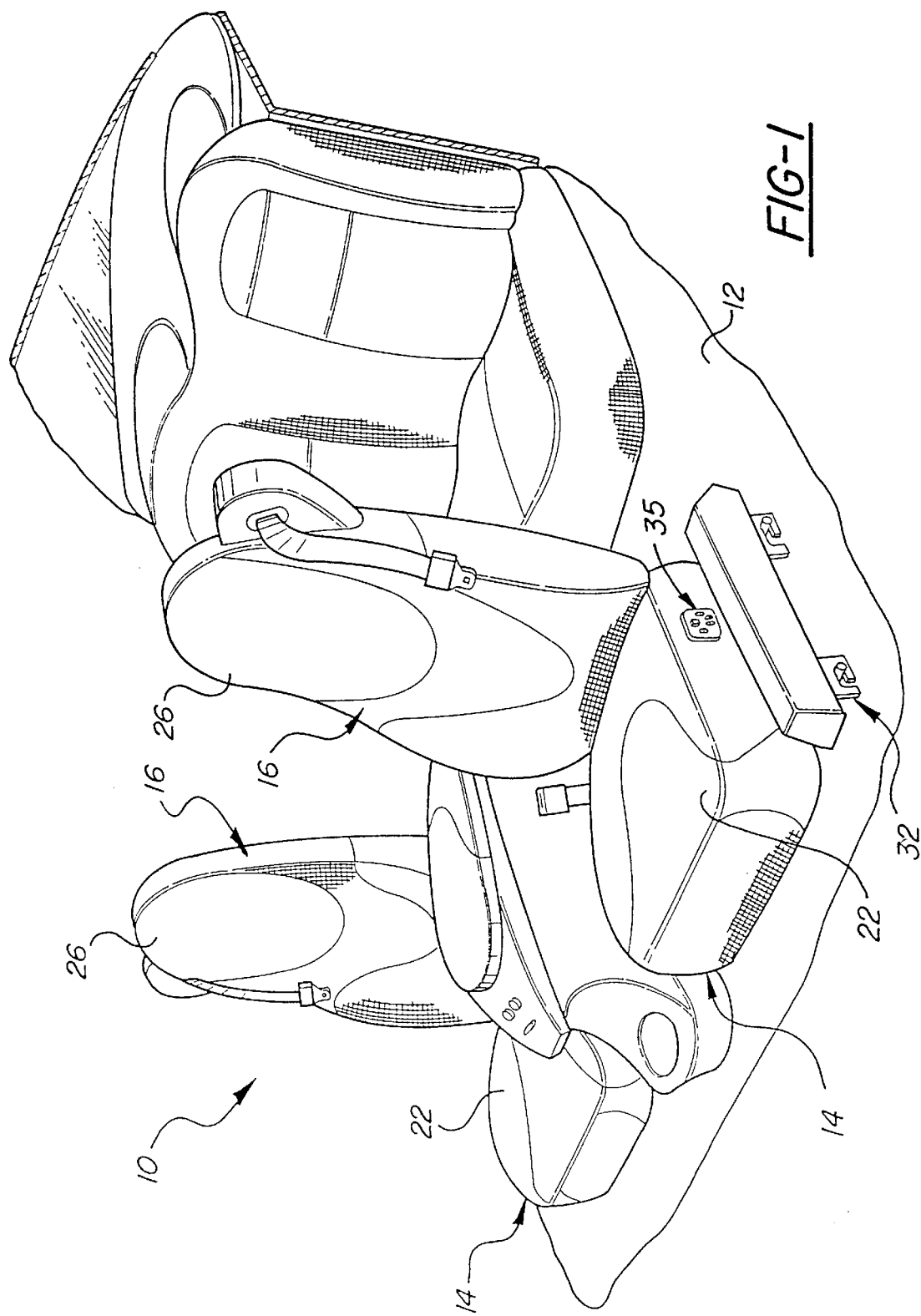
FIG. 1 is a fragmentary perspective view of a passenger compartment in an automobile showing two articulating seat assemblies according to the subject invention.

Referring to the Figures, wherein like numerals indicate like or corresponding parts throughout the several views, an adjustable seat assembly is generally indicated at 10. The seat assembly 10 is of the articulating and adjustable type disposed in the passenger compartment of an automobile. As shown in FIG. 1, the seat assembly 10 may be located in either of the driver's side front or passenger side front positions, securely attached to the floor panel 12. FIGS. 2–7 illustrate the seat assembly 10 in the driver's side front location.

Figure 2:
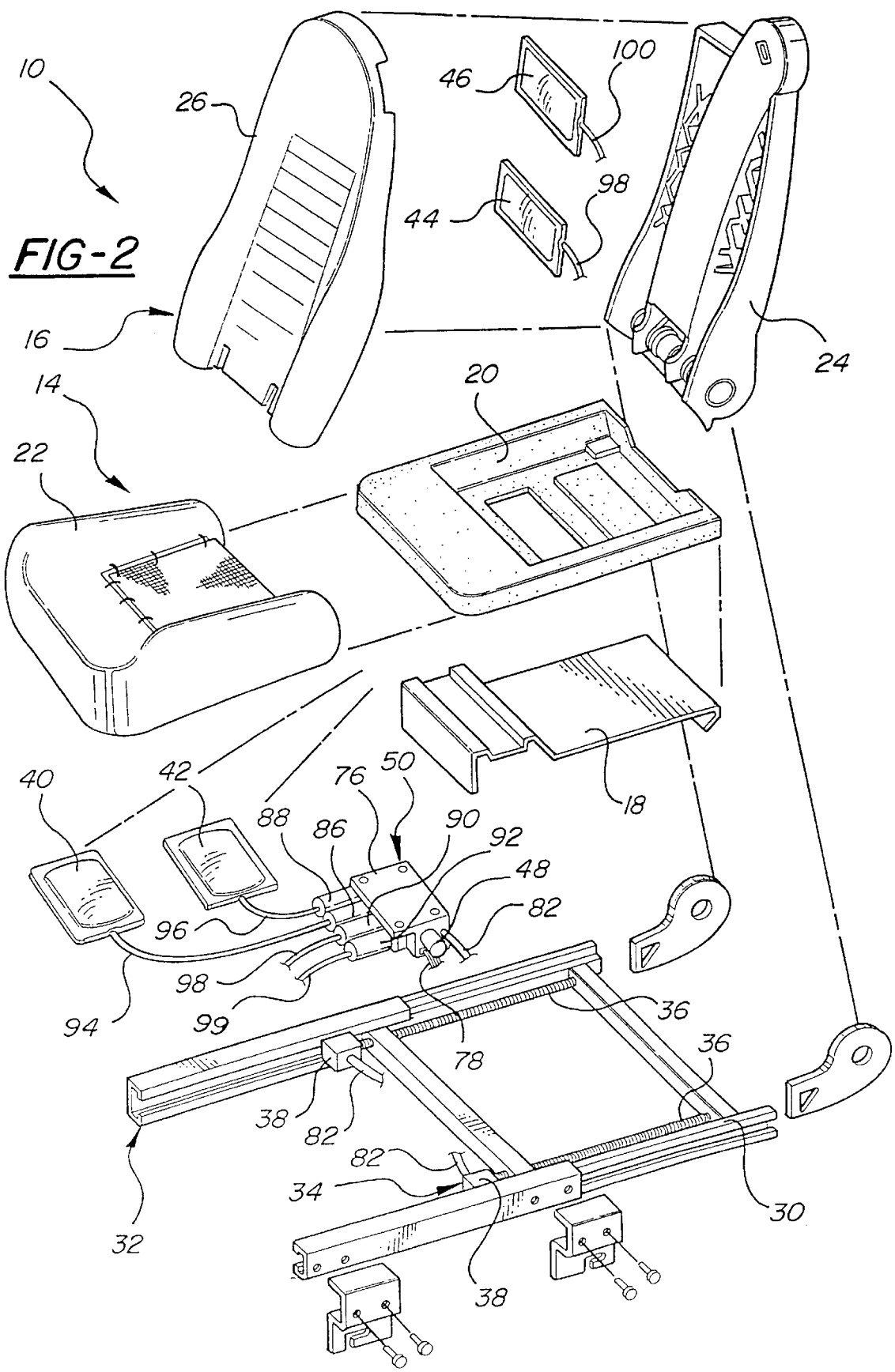
FIG. 2 is an exploded perspective view of a seat assembly according to the subject invention.
Figure 3:
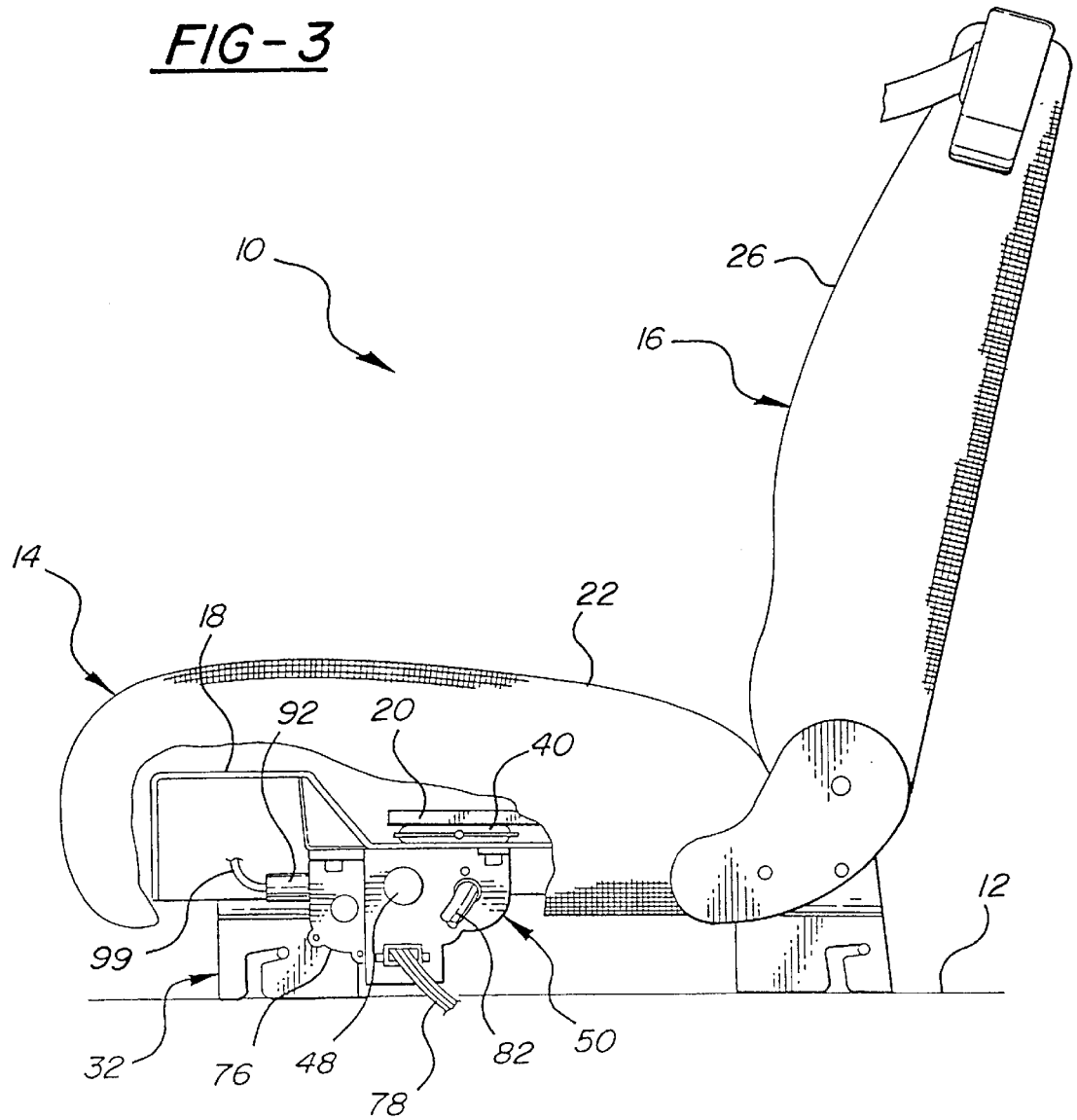
FIG. 3 is a side elevation view partially exposed to illustrate the universal motor and transmission of the subject invention mounted to the underside of the seat pan.

The seat assembly 10 includes a seat portion, generally indicated at 14, and a backrest portion, generally indicated at 16. As best shown in FIG. 2, the seat portion 12 is composed of an inner support frame which, in the preferred embodiment, comprises a sheet metal pan 18. A rigid table 20 overlays the seat pan 18, which in turn is enveloped by a foam or otherwise resilient cushion (not shown) and an outer pliable fabric, leather, or other sheet material 22. Similarly, the backrest portion 16 also includes an inner support frame 24, a cushion (not shown), and an outer cover 26. The lower end of the backrest portion 16 is pivotally connected to the rearward end of the seat portion 14.

The seat portion 14 includes right 28 and left 30 side rails which, in the preferred embodiment, comprise generally C-shaped channels. A floor mount, generally indicated at 32 in FIG. 2, is slidably connected to the right 28 and left 30 side rails in a typical telescopic manner. The floor mount 32 movably attaches the seat portion 14 within a passenger compartment of the automobile, to allow fore and aft position adjustment to suit the needs of the seat occupant. A position adjustor 34 is operatively disposed between each of the right 28 and left 30 side rails and the floor mount 32 for forcibly adjusting the fore and aft position of the seat assembly 10 within the passenger compartment in response to a reversible rotary input. The position adjustor 34 is operated under power to remotely control the fore and aft position of the seat assembly 10 via a switch 35 usually mounted to the edge of the seat portion 14, along the inner panel of the door (not shown), or in some other accessible location.

In the preferred and one alternative embodiment illustrated in the figures, the position adjustor 34 includes a pair of elongated screws 36 rotatably journaled one each along the inside of the right 28 and left 30 side rails. A screw drive mechanism 38 is positioned at the forward end of each screw 36. Each screw 36 is threadably engaged in a threaded socket in a cross bar of the floor mount 32, so that as the screws 36 are rotated in concert, the seat portion 14 is moved forward and rearward (i.e., fore and aft, depending upon the direction of rotation) relative to the floor mount 32.

Primary 40, 42 secondary 44, and tertiary 46 pneumatic adjustors are strategically associated with various areas of the seat portion 14 and backrest portion 16 for adjusting certain comfort conditions thereof in response to pressurized fluid, i.e., air, input. In the preferred embodiment, and referring again to FIG. 2, the primary pneumatic adjustor 40 comprises a simple air bladder disposed between the seat pan 18 and the table 20, adjacent the forward edge of the seat portion 14, for upwardly adjusting its angular condition. That is, as pressurized air is pumped into the primary pneumatic adjustor 40, it expands, raising the forward end of the seat portion 14 and consequently elevating the occupant. When the air bladder is permitted to deflate, the forward end of the seat portion 14 is lowered under force of gravity combined with the weight of the occupant. Preferably, a second primary pneumatic adjustor 42 is also disposed between the seat pan 18 and the table 20, adjacent the rearward edge of the seat portion 14, for upwardly adjusting its angular condition. The two primary pneumatic adjustors 40, 42 can function independently or in concert to raise the seat portion 14 in a translational manner or tilt it forwardly or rearwardly.

The secondary pneumatic adjustor 44 is likewise an air bladder, strategically located in the lower lumbar region of the backrest portion 16, between its support frame 24 and cover 26, for inflating to provide support and comfort to an occupant's lower back in response to pressurized fluid input. A tertiary pneumatic adjustor 46 can be located in the backrest portion 16 to provide additional head and neck support, as shown in FIG. 2, or in any other useful location. For example, alternative locations for the tertiary pneumatic adjustor 46 may include along the bolster(s) of either the seat portion 14 or backrest portion 16.

A particularly advantageous feature of the subject invention is that a single universal motor 48 is provided for controlling the position adjustor 34 and each of the pneumatic adjustors 40, 42, 44, and 46. The universal motor 48 is preferably attached beneath the seat pan 18 and moves with the seat portion 14 during fore and aft position readjustment. The universal motor 48 is operatively connected to a transmission, generally indicated at 50 in FIGS. 2–5, for selectively transmitting reversible rotary input to the position adjustor 34 and pressurized fluid input to the primary 40, 42, secondary 44 and tertiary 48 pneumatic adjustors. The transmission 50 includes a pneumatic pump 52 for transmitting pressurized fluid to each of the pneumatic adjustors 40, 42, 44, 46 and also a power take-off 54 for transmitting reversible rotary input to the position adjustor 34.

Figure 5:
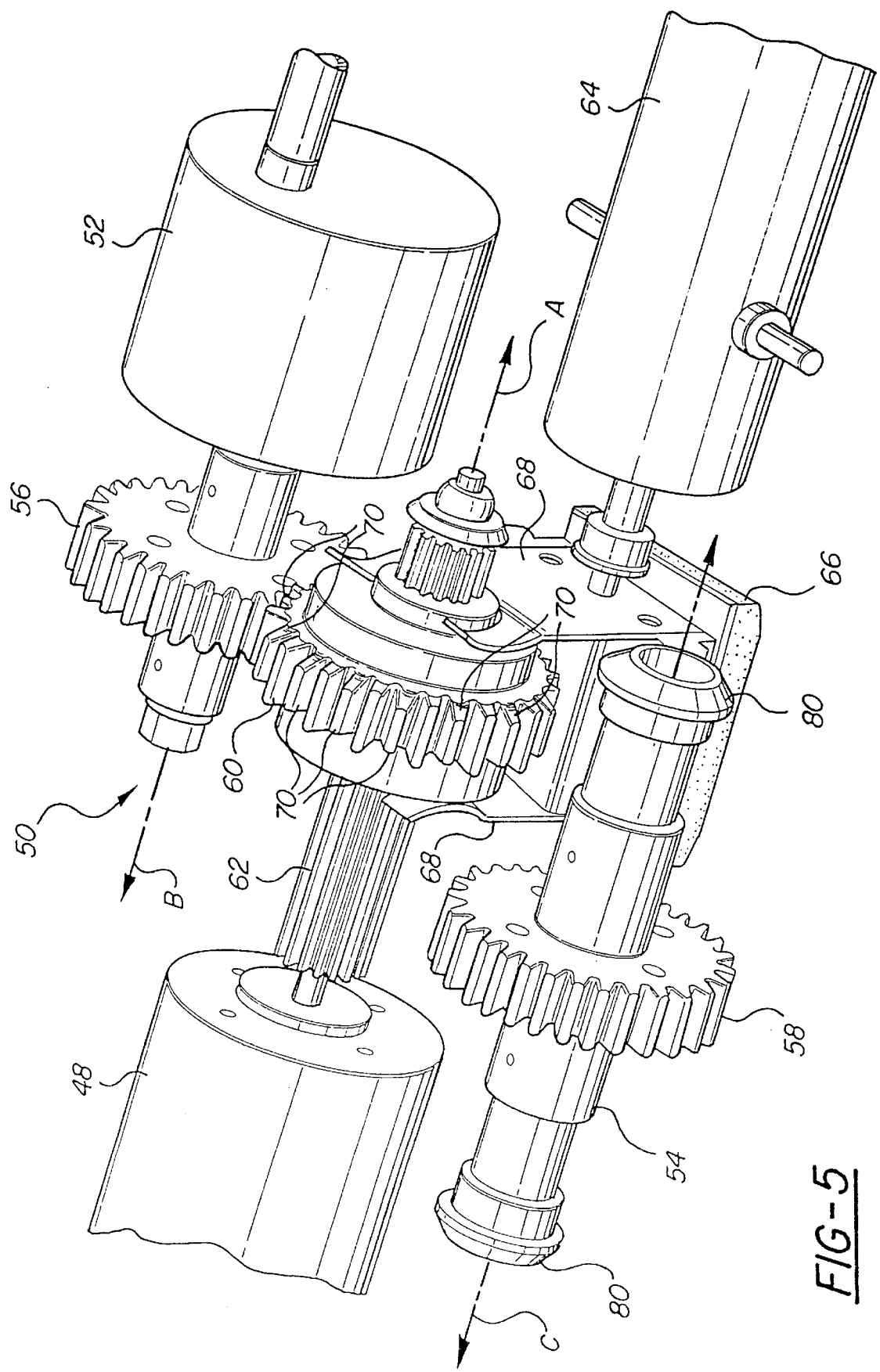
FIG. 5 is a perspective view of the respective rotary input and output elements of the pneumatic pump, the power take-off, and the universal motor.

As best shown in FIG. 5, the pneumatic pump 52 includes a first rotary input element, in the preferred form of a spur gear 56. Similarly, the power take-off 54 includes a second rotary input element, also a spur gear 58. The universal motor 48 has a rotary output element in the form of a pinion 60, also a spur gear, which is selectively engagable with the spur gears 56, 58 of the respective first and second rotary input elements. In this manner, the universal motor 48 may alternately transmit driving power from the pinion 60 to either one of the pneumatic pump 52 or power take-off 54, thereby powering either the position adjustor 34 or the pneumatic actuator(s) 40, 42, 44, 46.

The transmission 50 facilitates selective distribution of the motor 48 power by fixing the pinion 60 and each of the spur gears 56, 58 for rotation about respective axes A, B, C parallel to one another. The output shaft of the universal motor 48 is coaxially disposed relative to the axis A of the pinion 60 and has a full compliment of longitudinally extending splines 62 formed there along. The pinion 60 is matingly disposed on the splines 62 for sliding movement along the axis A, and into alternating engagement with the respective spur gears 56, 58. That is, the motor 48 remains fixed in its position while the pinion 60 slides back and forth relative to the spur gears 56, 58.

In the preferred embodiment of the invention (FIGS. 2–6), wherein a single pinion 60 meshes directly with each of the spur gears 56, 58, the radial distance between the axis A of the pinion 60 and the theoretical pitch circle of the spur gear 56 for the pneumatic pump 52 is equal to the radial distance between the axis A of the pinion 60 and the theoretical pitch circle of the spur gear 58 of the power take-off 54. And, because each of the spur gears 56, 58, 60 have straight teeth extending parallel to the axes A, B, C, the pinion 60 freely slides into meshing engagement with either of the spur gears 56, 58.

The transmission 50 includes a linear actuator 64 and a shuttle 66 operatively connected to the linear actuator 64 for forcibly moving the pinion 60 along the spline 62 between one of two positions. In one position, the pinion 60 fully meshes with the spur gear 56 for the pneumatic pump 52, as shown in FIG. 5. In another position, the pinion 60 meshes with the spur gear 58 for the power take-off 54.

Preferably, the shuttle 66 includes a yoke having a pair of opposing flex arms 68 straddling the pinion 60. An armature of the linear actuator 64 pushes and pulls the shuttle 66 together with the flex arms 68 and pinion 60 between the two operating positions. The linear actuator 64 may be of any type known to those skilled in the art, such as a solenoid or a power screw. The ensure crisp and non-binding engagement of the gears 56, 58, 60, every other one of the teeth on the pinion 60 includes relieved ends 70, and all of the pinion teeth have rounded, or bull-nosed, edges. This is particularly useful since, in the preferred embodiment of the invention, the universal motor 48 spins at a low "poke" speed as the pinion 60 engages the other spur gears 56, 58.

Figure 6:
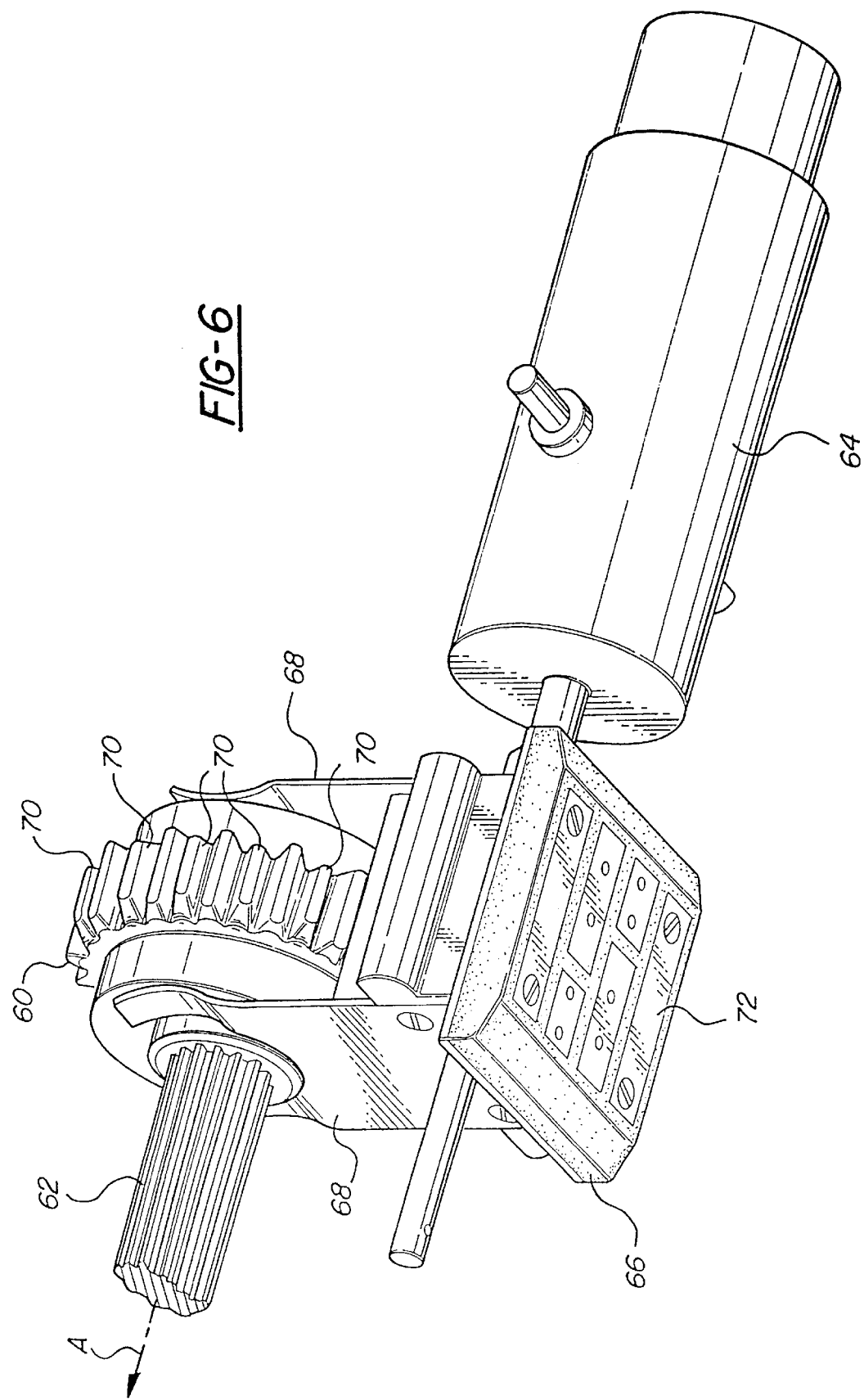
FIG. 6 is a perspective view of the linear actuator and shuttle arrangement of the transmission.
Figure 7:
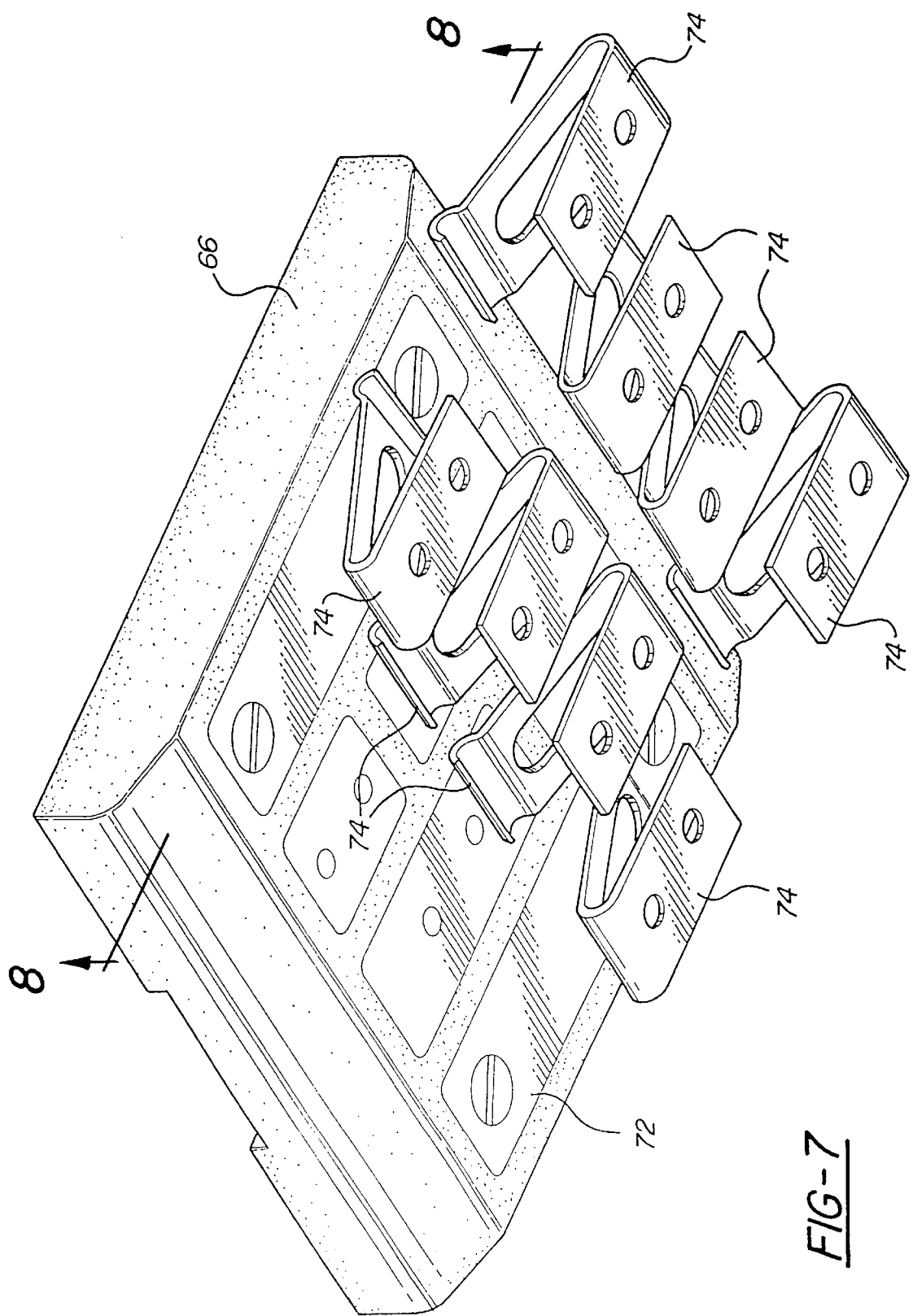
FIG. 7 is a fragmentary perspective view showing the electrical contact switching arrangement of the shuttle.
Figure 8:
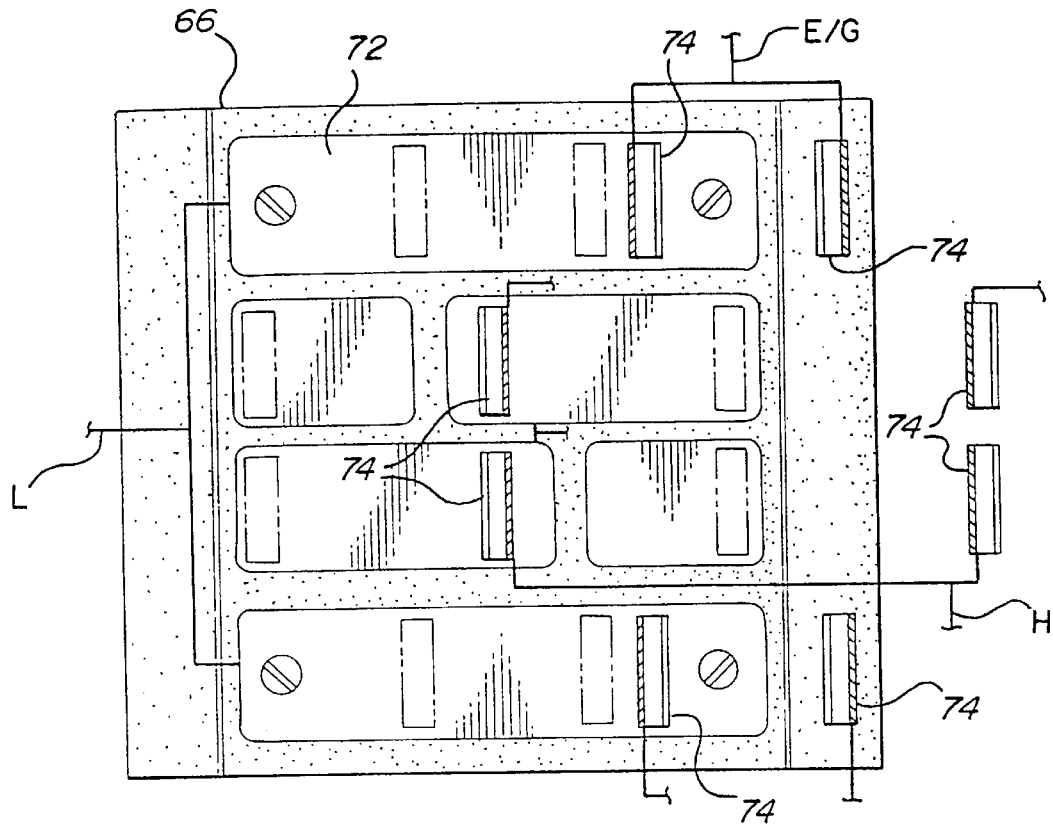
FIG. 8 is a cross-sectional view taken along lines 8—8 of FIG. 7 showing the brushes in phantom in an intermediate position between pinion engagement with either of the spur gears.
Figure 9:
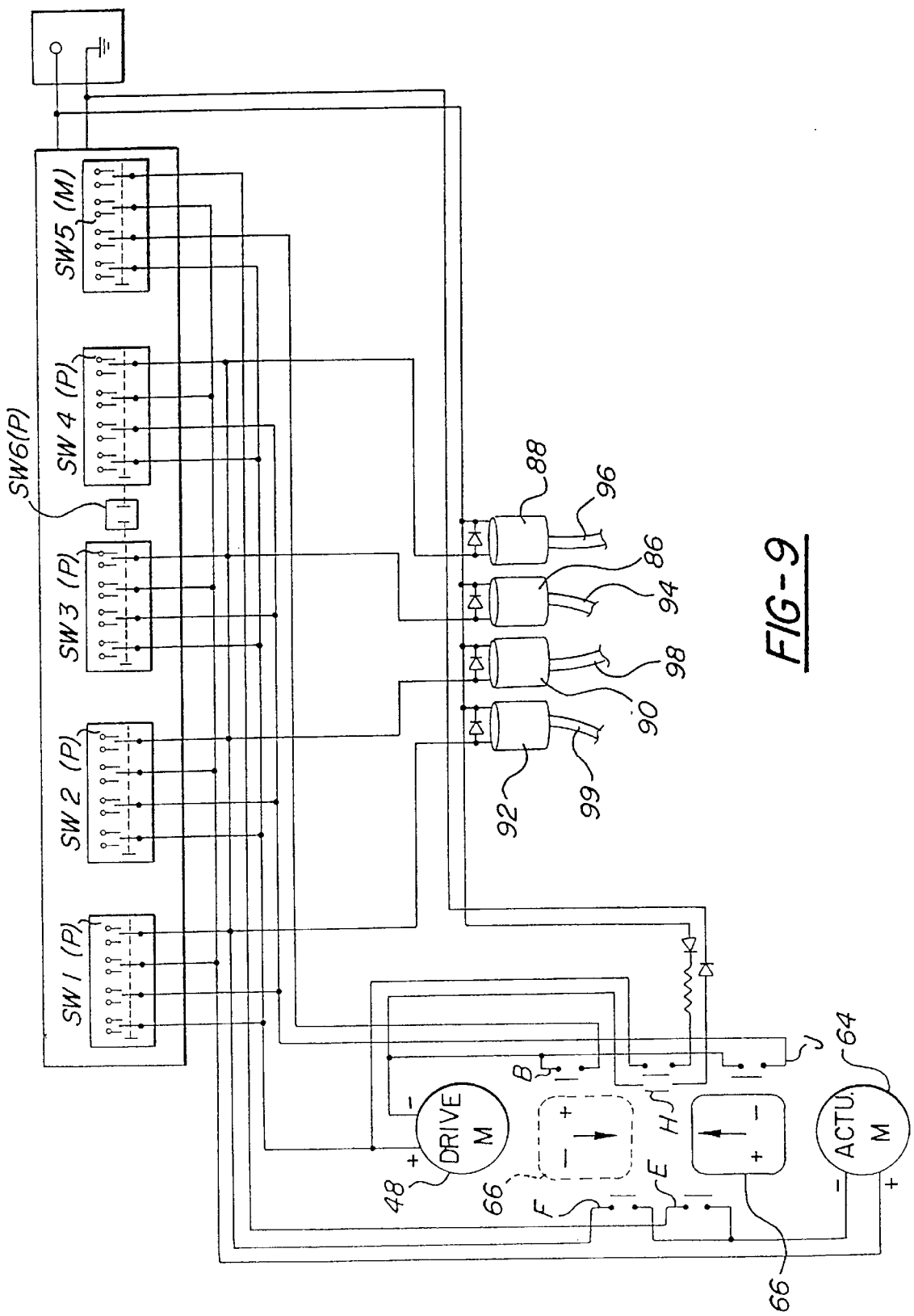
FIG. 9 is a schematic electrical diagram of the preferred embodiment of FIGS. 1–8.

Referring to FIGS. 6–8, the shuttle 66 may include an electrical switch contact plate 72 on its lowermost side. The contact plate 72 slides against an array of stationary brushes 74. The brushes 74 are held in a stationary position within a housing 76 which surrounds the spur gears 56, 58, pinion 60 and shuttle 66. The position of the shuttle 66 establishes a unique ealectrical circuit between the brushes 74 and the contact plate 72, which signals are transmitted via a wiring harness 78 to the universal motor 48 and linear actuator 64, as best shown in FIG. 9. Some of the more prominent switching connections are identified by the reference letters E, F, G, H, I, and J in FIGS. 8 and 9.

In either of the extreme positions of the shuttle 66, corresponding to the two engaged positions o f the pinion 60, electrical circuits are established to permit the motor 48 to be driven in either rotary direction via the switch 35, or for the linear actuator 64 to move the pinion 60 into engagement with the other spur gear. One extreme position is shown in solid in FIG. 8. Approximately half-way between the two engaged positions of the pinion 60, as shown in phantom in FIG. 8, the brushes 74 establish a temporary electrical circuit which causes a low voltage to be delivered to the motor 48, resulting in a slow "poke" speed of the pinion 60 which facilitates smooth meshing with the spur gears and prevents binding. Also, when in either of the extreme positions, two overhanging brushes 74 of the outside pair abut an angled edge of the shuttle 66 which helps to restrain it in position, i.e., against return movement.

Figure 10:
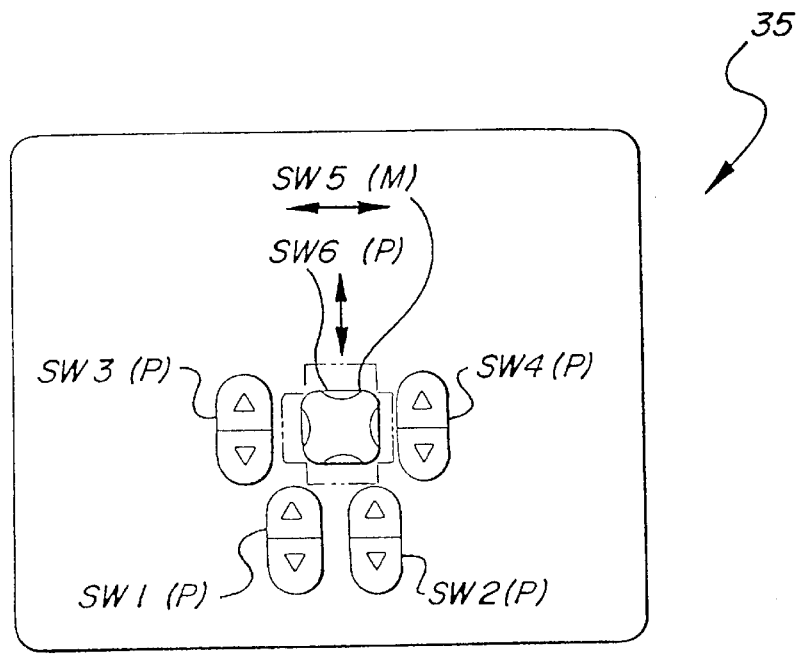
FIG. 10 is a simplified front view of a switch device for controlling the subject invention.

In FIG. 10, the switch 35 is shown having four rocker-type buttons SW1, SW2, SW3, and SW4. The buttons SW1 and SW2 individually control the respective secondary 44 and tertiary 46 pneumatic adjustors, whereas the buttons SW3 and SW4 individually control the respective forward 40 and rearward 42 primary pneumatic adjustors. The buttons SW1, SW2, SW3, SW4 each have a neutral or home position, and can be manually depressed at either their top end or bottom end to inflate or deflate the corresponding pneumatic adjustor. When any one of the buttons SW1, SW2, SW3, SW4 is actuated, the pinion 60 is engaged (or moves into engagement) with the spur gear 56 of the pneumatic pump 52 to either inflate or deflate the respective pneumatic adjustor depending upon rotary direction of the motor 48.

A small joy-stick type button SW5/SW6 is confined to movement in a North-South-East-West pattern, i.e., in a "+" shape, as shown in phantom in FIG. 10. The button SW5/SW6 also has a neutral or home position in the center of the "+" path. When the button SW5/SW6 is moved upwardly, i.e., to the "North," both of the forward 40 and rearward 42 primary pneumatic adjustors are inflated in unison to raise the seat portion 14. Conversely, when the button SW5/SW6 is moved downwardly, i.e., to the "South," both of the forward 40 and rearward 42 primary pneumatic adjustors are deflated in unison to lower the seat portion 14.

When the button SW5/SW6 is moved forwardly, i.e., to the "West" as viewed in FIG. 10, the pinion 60 is engaged (or moves into engagement) with the spur gear 58 of the power take-off. This transfers forward rotary driving torque from the motor 48 to the position adjustor 34 for the seat assembly 10, which moves the seat assembly 10 forward relative to the floor panel 12. Conversely, when the button SW5/SW6 is moved rearwardly, i.e., to the "East," the pinion 60 is engaged (or moves into engagement) with the spur gear 58 of the power take-off, and transfers forward rotary driving torque from the motor 48 to move the seat assembly 10 rearward relative to the floor panel 12.

Referring again to FIG. 5, the power take-off 54 is shown including a pair of axially opposed drive couplings 80 extending from opposite sides of the spur gear 58 along the axis C thereof. A flexible drive shaft 82 extends from each of the drive couplings 80 and operatively connects to each screw drive mechanism 38 of the position adjustor 34. Therefore, when the pinion 60 is engaged with the spur gear 58 of the power take-off 54, the two flexible drive shafts 82 are simultaneously rotated and cause the respective screws 36 to advance or retract the seat portion 14, depending upon the direction the universal motor 48 is turning.

Figure 4:
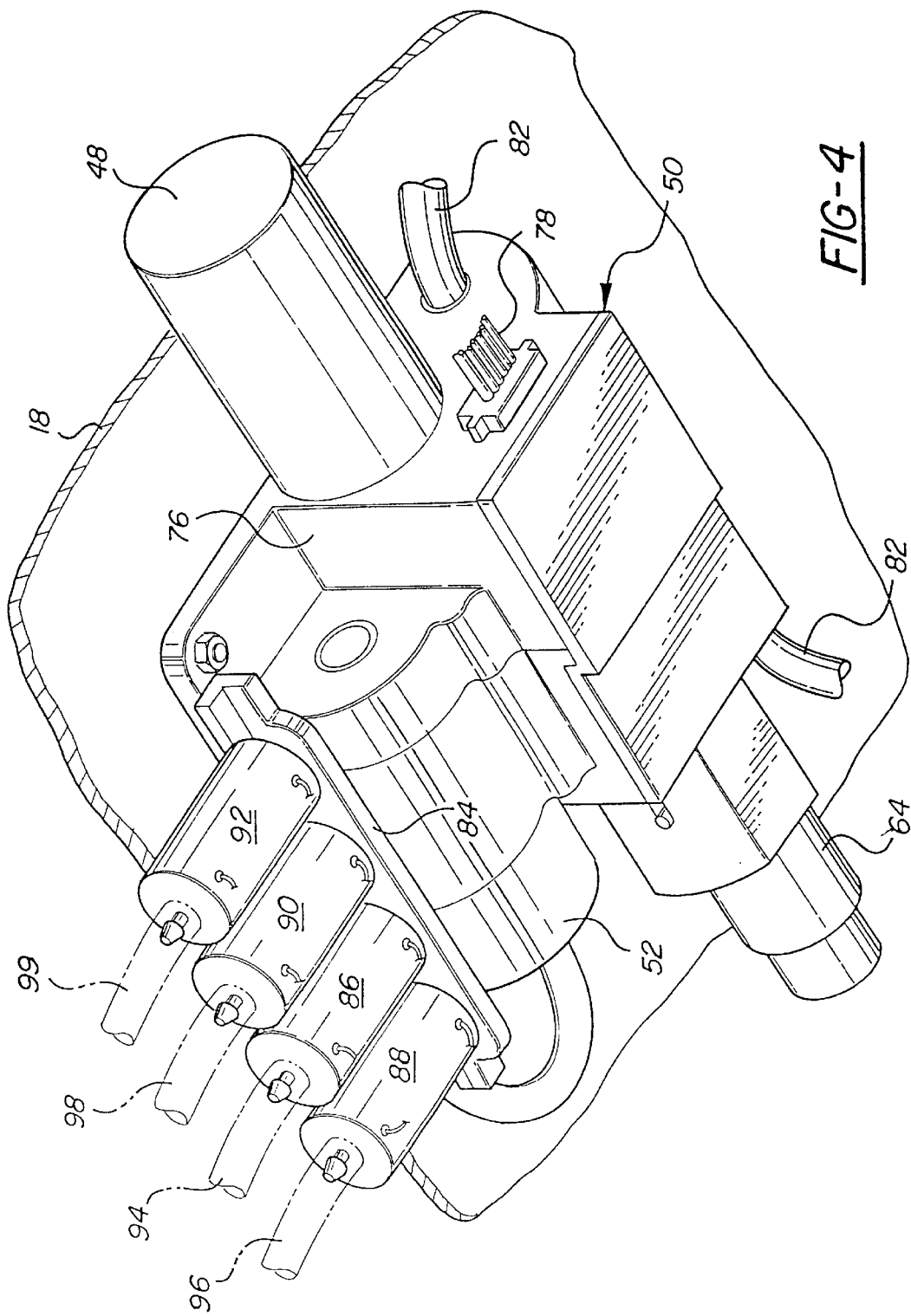
FIG. 4 is a perspective view the preferred universal motor and transmission mounted to the underside of the seat pan.

In FIG. 4, the assembly is shown further including a manifold 84 for receiving pressurized fluid from the pneumatic pump 52 and distributing same to the primary 40, 42, secondary 44 and tertiary 46 pneumatic adjustors. A plurality of valves 86, 88, 90, 92, one each associated with the respective primary 40, 42, secondary 44 and tertiary 46 pneumatic adjustors, are operatively connected to the manifold 84 for controlling the flow of pressurized fluid thereto. The valves 86, 88, 90, 92 are independently operated via the electrical switch 35 under the control of the occupant. Therefore, if the occupant calls for increased lumbar support by so manipulating the button SW2 of the electrical switch 35, the secondary valve 90 will allow pressurized air generated by the pneumatic pump 52 to flow to the secondary pneumatic adjustor 44. Conversely, if the occupant calls for decreased lumbar support by so manipulating the button SW2, the secondary valve 90 will allow a vacuum generated by the pneumatic pump 52 to withdraw air from the secondary pneumatic adjustor 44. This operation is common for all of the valves 86–92. Pressure transmitting primary 94, 96, secondary 98 and tertiary 99 conduits interconnect the respective valves 86, 88, 90, 92 to the associated pneumatic adjustors 40, 42, 44, 46.

Figure 11:
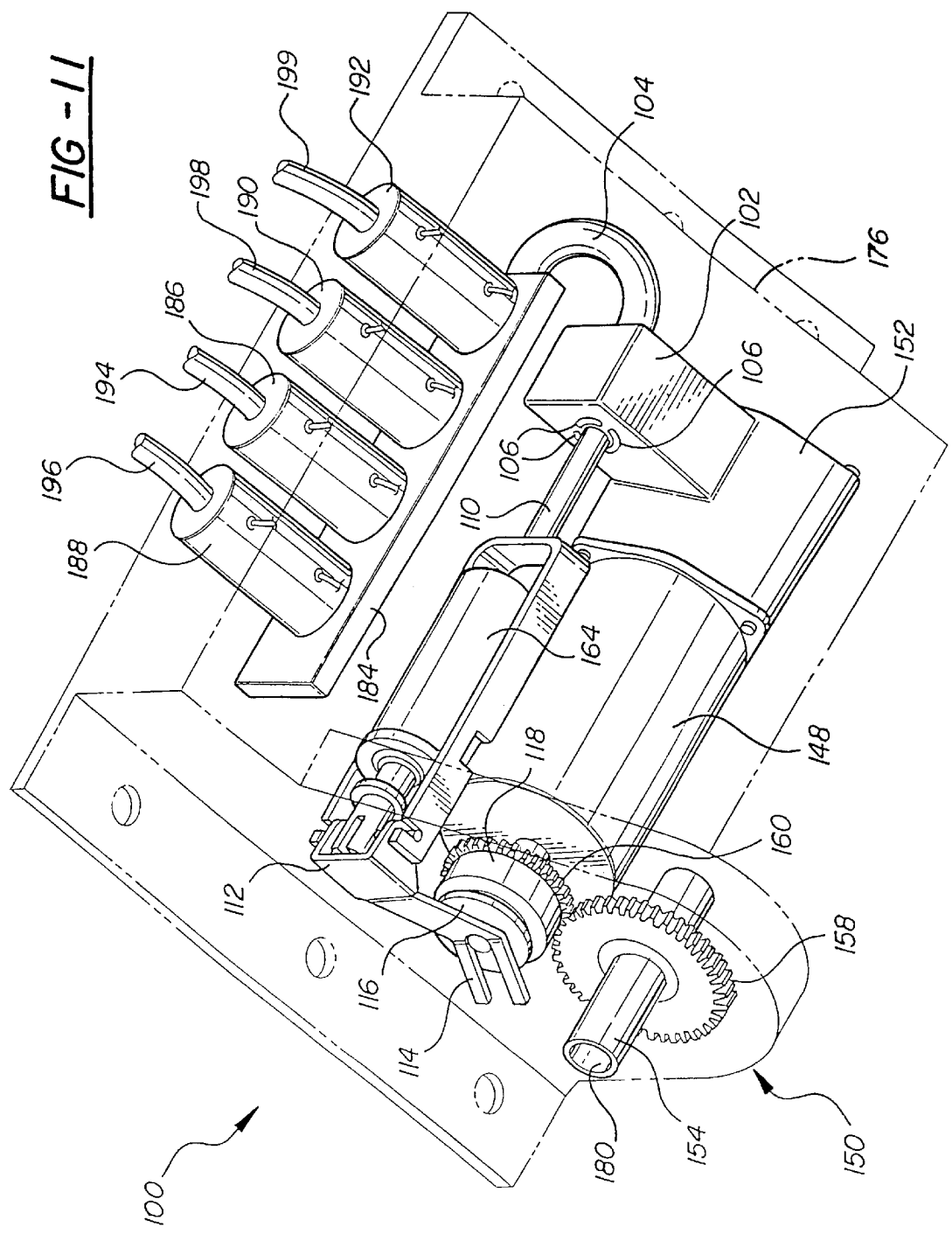
FIG. 11 is a perspective view of an alternative transmission including a housing therefor shown in phantom.

In FIGS. 11–13, an alternative embodiment of the subject transmission is generally shown at 100. In this alternative embodiment, the manifold 184, valves 186, 188, 190, 192 and associated distribution conduits 194, 196, 198, 199 are identical to those as used in the preferred embodiment, and therefore like reference numerals are used with the prefix "1" for convenience. Similarly, other features are substantially identical to those in the preceding embodiment, such that wherever expedient like reference numerals with the prefix "1" will be used hereinafter and in the drawing figures.

The transmission 100 includes a universal motor 148 which is permanently connected to a pneumatic pump 152. That is, the first rotary input element of the pump 152 is connected directly to the output shaft of the motor 148, such that whenever the motor 148 is operating the pneumatic pump 152 is also operating. The pneumatic pump 152 discharges pressurized air into a receiving area 102 which is in direct fluid communication with the manifold 184 via a short tube 104. The receiving area 102 is fitted with a bypass valve arrangement comprising a series of openings 106 and an internal disk-shaped seal 108 to selectively cover the openings 106.

When the seal 108 covers the openings 106 (FIG. 12), hereinafter referred to as the "pneumatic position," pressurized air from the pump 152 is routed to the manifold 184 for inflating one of the pneumatic adjustors. However, when the seal 108 is spaced away from (uncovers) the openings 106 (FIG. 13), hereinafter referred to as the "mechanical position," pressurized air from the pump 152 is allowed to vent to atmosphere, with none flowing to the manifold 184 due to the pressure differential.

The seal 108 is carried on a shaft 110, which in turn is controlled by a linear actuator 164, preferably a solenoid. The linear actuator 164 may be spring biased toward the pneumatic position. Also controlled by the linear actuator 164, in unison with the shaft 110, is a throw arm 112. The throw arm 112 has a forked end 114 which bears against the inside of the housing 176.

A flywheel 116 is attached to the output shaft of the universal motor 148, and rotates in coupled unison therewith whenever the motor 148 is operating. The flywheel 116 is longitudinally moveable along the output shaft, and biased away from the motor 148. The inner face of the flywheel 116 has a convex conical surface. A crook in the forked end 114 of the throw arm 112 abuts the outside face of the flywheel 116.

A pinion 160 is concentrically and freely rotatably disposed about the output shaft of the motor 148, i.e., the pinion 160 is not drivingly connected to the output shaft of the motor 148. The pinion 160 includes an integral clutch 118 having a concave conical surface opposing the convex conical surface of the flywheel 116. Both the concave conical surface of the clutch 118 and the convex conical surface of the flywheel 116 may be made of a durable and friction enhancing material or be provided with a coating to achieve similar characteristics.

When the linear actuator 164 is in the pneumatic position (FIG. 12), the convex conical surface of the flywheel 116 is spaced away from the concave conical surface of the clutch 118 such that the pinion 160 remains stationary even when the motor 148 is operating. However, when the linear actuator 164 is moved to the mechanical position, as shown in FIG. 13, the throw arm 112 pushes the flywheel into engagement with the clutch 118. This allows driving torque from the motor 148 to be transmitted to the pinion 160, which in turn flows to the spur gear 158. The spur gear 158 then moves the seat assembly forward or backward via the position adjustor, depending upon the rotary direction of the motor 148. Because the output from the pneumatic pump 152 is vented through the openings 102 when the pinion 160 is engaged, there is very little back pressure on the pump 152 and hence causes only negligible power loss.

In this alternative embodiment, the pneumatic adjustors are not deflated under power of the motor 148, but instead are passively deflated under gravity and the weight of a seated occupant. More specifically, when an occupant calls for deflation of one of the pneumatic adjustors, the motor 148 is not energized, but the linear actuator 164 is moved to the mechanical position. At the same time, the associated valve 186, 188, 190, 192 is opened to allow air at a higher pressure within the pneumatic adjustor to vent to atmosphere via the uncovered openings 102.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. An adjustable seat assembly for an automobile, said assembly comprising: a seat portion; a floor mount slidably connected to said seat portion for moveably attaching said seat portion within a passenger compartment of the automobile; a position adjustor operatively disposed between said seat portion and said floor mount for forcibly adjusting the fore and aft position of said seat assembly within the passenger compartment in response to a reversible rotary input; a backrest portion extending upwardly from said seat portion; a primary pneumatic adjustor operatively associated with one of said backrest portion and said seat portion for adjusting a condition of said one of said backrest portion and said seat portion in response to pressurized fluid input; a universal motor; and a transmission operatively connected to said universal motor for selectively transmitting reversible rotary input to said position adjustor and pressurized fluid input to said primary pneumatic adjustor.

2. An assembly as set forth in claim 1 wherein said transmission includes a pneumatic pump having a first rotary input element.

3. An assembly as set forth in claim 2 wherein said transmission includes a power take-off having a second rotary input element.

4. An assembly as set forth in claim 3 wherein said transmission includes a linear actuator for selectively engaging and disengaging said universal motor from said power take-off and said pneumatic pump from said primary pneumatic adjustor.

5. An assembly as set forth in claim 3 wherein said universal motor includes a rotary output element selectively engagable with said first and second rotary input elements.

6. An assembly as set forth in claim 5 wherein said rotary output element and each of said first and second rotary input elements are supported for rotation about respective axes parallel to one another.

7. An assembly as set forth in claim 6 wherein said rotary output element and each of said first and second rotary input elements include a spur gear.

8. An assembly as set forth in claim 7 wherein each of said spur gears have a theoretical pitch circle, and wherein the radial distance between said axis of said rotary input element and said pitch circle of said first rotary input element is equal to the radial distance between said axis of said rotary input element and said pitch circle of said second rotary input element.

9. An assembly as set forth in claim 8 wherein each of said spur gears have straight teeth extending parallel to said axes.

10. An assembly as set forth in claim 8 wherein every other one of said teeth on said spur gear of said rotary output element includes relieved ends.

11. An assembly as set forth in claim 6 wherein said universal motor includes an output shaft coaxially disposed relative to said axis of said rotary output element and having longitudinally extending splines formed therein.

12. An assembly as set forth in claim 11 wherein said rotary output element includes a pinion slidably disposed along said spline.

13. An assembly as set forth in claim 12 wherein said transmission includes a shuttle for forcibly moving said pinion along said spline between selective engagement with either one of said first and second rotary input element.

14. An assembly as set for in claim 13 wherein said transmission includes a linear actuator operatively connected to said shuttle.

15. An assembly as set forth in claim 13 wherein said shuttle includes a yoke straddling said pinion.

16. An assembly as set forth in claim 15 wherein said yoke includes a pair of opposing flex arms.

17. An assembly as set forth in claim 13, wherein said shuttle includes an electrical switch contact plate.

18. An assembly as set forth in claim 3 wherein said power take-off includes a pair of axially opposed drive couplings.

19. An assembly as set forth in claim 18 wherein said opposing drive couplings extend from opposite sides of said second rotary input element along said axis thereof.

20. An assembly as set forth in claim 18 wherein said power take-off includes a flexible drive shaft extending from each of said drive couplings and operatively connected to said position adjustor.

21. An assembly as set forth in claim 3 further including a pressure transmitting primary conduit interconnecting said pneumatic pump and said primary pneumatic adjustor.

22. An assembly as set forth in claim 18 further including a primary valve for controlling the flow of pressurized fluid along said primary conduit.

23. An assembly as set forth in claim 22 further including a manifold for receiving pressurized fluid from said pneumatic pump, said primary valve operatively connected to said manifold.

24. An assembly as set forth in claim 23 further including a secondary pneumatic adjustor operatively associated with one of said backrest portion and said seat portion for adjusting a condition of said one of said backrest portion and seat portion in response to pressurized fluid input from said pneumatic pump, pressure transmitting secondary conduit interconnecting said pneumatic pump and said secondary pneumatic adjustor, and a secondary valve connected to said manifold for controlling the flow of pressurized fluid along said secondary conduit.

25. An assembly as set forth in claim 24 wherein said primary and secondary valves are responsive to electrical control signals.

26. An assembly as set forth in claim 1, wherein said transmission includes a linear actuator, a pinion and a clutch responsive to said linear actuator for selectively engaging and disengaging said pinion from said universal motor.

27. An assembly as set forth in claim 2 wherein said pneumatic pump includes a receiving area having at least one vent opening.

28. An assembly as set forth in claim 27 wherein said linear actuator includes a shaft having a seal disposed thereon for selectively covering said opening in said receiving area.

29. An assembly as set forth in claim 28 wherein said universal motor includes a flywheel and said linear actuator includes a throw arm operatively engaging said flywheel.

30. An adjustable seat assembly for an automobile, said assembly comprising: a seat portion having right and left side rails; a floor mount slidably connected to said right and left side rails of said seat portion for moveably attaching said seat portion within a passenger compartment of the automobile; a position adjustor operatively disposed between said right and left side rails and said floor mount for forcibly adjusting the fore and aft position of said seat assembly within the passenger compartment in response to a reversible rotary input; a backrest portion extending upwardly from said seat portion; a primary pneumatic adjustor operatively associated with said seat portion for adjusting a vertical condition thereof in response to pressurized fluid input; a secondary pneumatic adjustor operatively associated with said backrest portion for adjusting a distended condition thereof in response to pressurized fluid input; a universal motor; a transmission operatively connected to said universal motor for selectively transmitting reversible rotary input to said position adjustor and pressurized fluid input to each of said primary and secondary pneumatic adjustors; said transmission including a pneumatic pump for transmitting pressurized fluid to each of said primary and secondary pneumatic adjustors and a power take-off for transmitting reversible rotary input to said position adjustor.

31. An assembly as set forth in claim 30 wherein said pneumatic pump includes a first rotary input element, said power take-off includes a second rotary input element, and said universal motor includes a rotary output element selectively engagable with at least one of said first and second rotary input elements.

32. An assembly as set forth in claim 31 wherein said transmission includes a linear actuator for selectively engaging and disengaging said universal motor from said power take-off and said pneumatic pump from said primary pneumatic adjustor.

33. An assembly as set forth in claim 32 wherein said transmission includes a pinion and a clutch responsive to said linear actuator for selectively engaging and disengaging said pinion from said universal motor.

34. An assembly as set forth in claim 33 wherein said pneumatic pump includes a receiving area having at least one vent opening.

35. An assembly as set forth in claim 34 wherein said linear actuator includes a shaft having a seal disposed thereon for selectively covering said opening in said receiving area.

36. An assembly as set forth in claim 35 wherein said universal motor includes a flywheel and said linear actuator includes a throw arm operatively engaging said flywheel.

37. An assembly as set forth in claim 31 wherein said rotary output element and each of said first and second rotary input elements are supported for rotation about respective axes parallel to one another.

38. An assembly as set forth in claim 37 wherein said rotary output element and each of said first and second rotary input elements include a spur gear having a theoretical pitch circle, and wherein the radial distance between said axis of said rotary input element and said pitch circle of said first rotary input element is equal to the radial distance between said axis of said rotary input element and said pitch circle of said second rotary input element.

39. An assembly as set forth in claim 38 wherein each of said spur gears have straight teeth extending parallel to said axes, and every other one of said teeth on said spur gear of said rotary output element includes relieved ends.

40. An assembly as set forth in claim 37 herein said universal motor includes an output shaft coaxially disposed relative to said axis of said rotary output element and having longitudinally extending splines formed therein, and said rotary output element includes a pinion slidably disposed along said spline.

41. An assembly as set forth in claim 40 wherein said transmission includes a linear actuator and a shuttle operatively connected to said linear actuator for forcibly moving said pinion along said spline between selective engagement with either one of said first and second rotary input element, said shuttle including a yoke having a pair of opposing flex arms straddling said pinion.

42. An assembly as set forth in claim 31 wherein said power take-off includes a pair of axially opposed drive couplings extending from opposite sides of said second rotary input element along said axis thereof, and a flexible drive shaft extending from each of said drive couplings and operatively connected to said position adjustor.

43. An assembly as set forth in claim 30 further including a manifold for receiving pressurized fluid from said pneumatic pump, a primary valve operatively connected to said manifold for controlling the flow of pressurized fluid to said primary pneumatic adjustor, and a secondary valve operatively connected to said manifold for controlling the flow of pressurized to said secondary pneumatic adjustor.

44. An assembly as set forth in claim 43 wherein said primary and secondary valves are responsive to electrical control signals.

* * * * *